(12) United States Patent
Maeda

(10) Patent No.: US 9,282,255 B2
(45) Date of Patent: Mar. 8, 2016

(54) IMAGING APPARATUS AND CONTROL METHOD

(75) Inventor: Tatsuo Maeda, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 483 days.

(21) Appl. No.: 13/592,446

(22) Filed: Aug. 23, 2012

(65) Prior Publication Data

US 2013/0057672 A1    Mar. 7, 2013

(30) Foreign Application Priority Data

Sep. 7, 2011   (JP) ................. 2011-194830

(51) Int. Cl.
*H04N 5/235* (2006.01)
*G06K 7/10* (2006.01)

(52) U.S. Cl.
CPC .................. *H04N 5/2354* (2013.01)

(58) Field of Classification Search
CPC ............ H04N 5/2354; G06K 7/10544; G06K 7/1098; G06K 7/10811
See application file for complete search history.

(56) References Cited

U.S. PATENT DOCUMENTS

| 2002/0050518 | A1* | 5/2002 | Roustaei ................. 235/454 |
| 2012/0056289 | A1* | 3/2012 | Tian et al. ............... 257/431 |
| 2012/0188404 | A1* | 7/2012 | Muukki et al. .......... 348/229.1 |

FOREIGN PATENT DOCUMENTS

JP    2006-030162    2/2006

* cited by examiner

*Primary Examiner* — Jefferey Harold
*Assistant Examiner* — Sean Haiem
(74) *Attorney, Agent, or Firm* — Hazuki International, LLC

(57) ABSTRACT

There is provided an imaging apparatus that includes a reception section, and an output section. The reception section is configured to receive a trigger from an external apparatus at a timing for reset and readout of an imaging element. The output section is configured to provide back, to the apparatus, a status indicating in which state the imaging element is when the reception section receives the trigger.

20 Claims, 11 Drawing Sheets

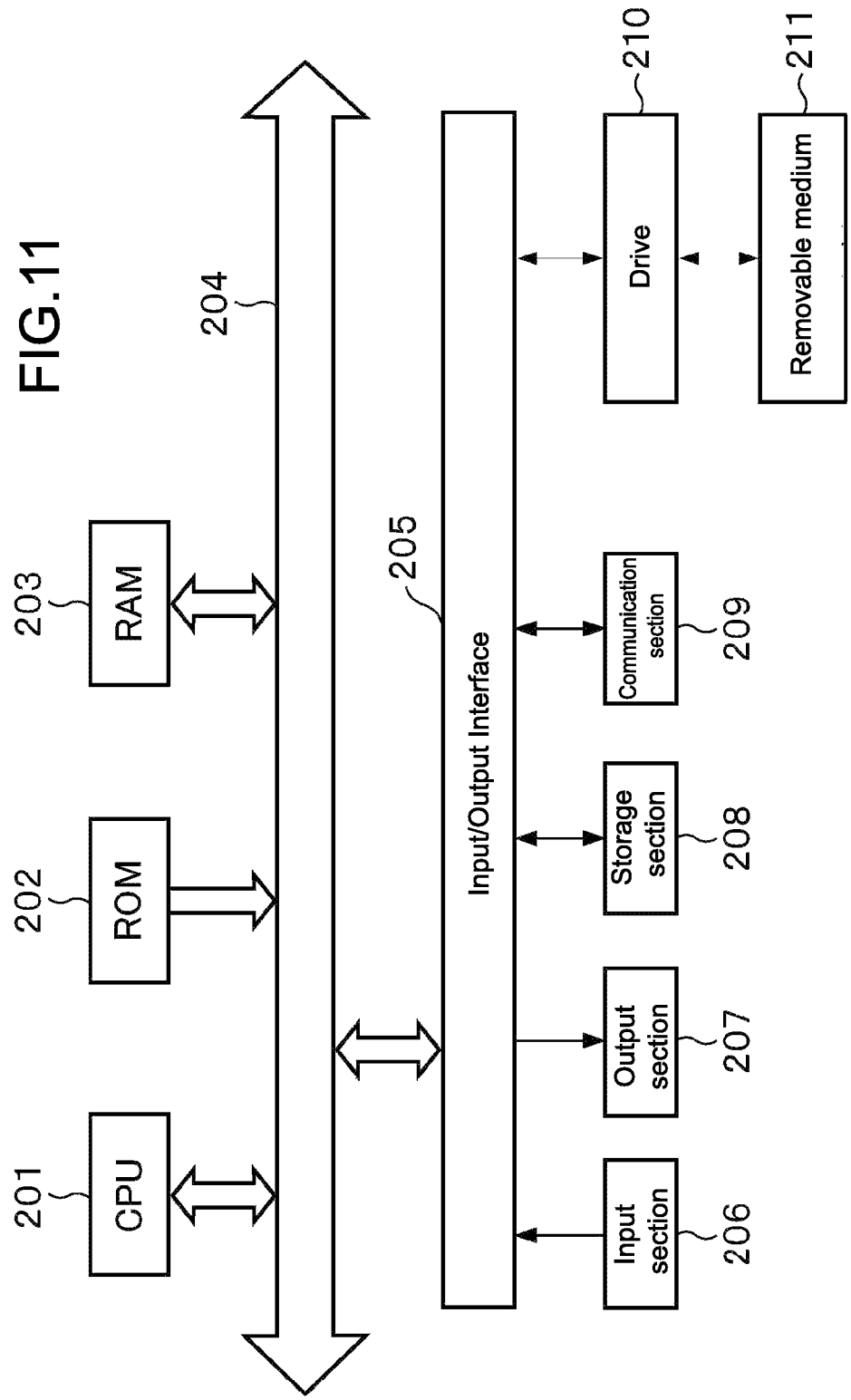

IMAGING APPARATUS AND CONTROL METHOD

BACKGROUND

The present disclosure relates to an imaging apparatus and a control method and, more specifically, to an imaging apparatus and a control method with which the entire processing is increased in speed.

A chemical sensor or a biosensor has been recently increased in demand for displaying two-dimensional images about the measurement of pH of solutions, the analysis of DNA (deoxyribonucleic acid) or protein, and others. Such a chemical sensor may be provided with a camera board for use of fluorescence detection with no external shutter, for example. In this case, there is expected to establish precise synchronization between a light source and the light exposure of a camera for a better S/N (signal-to-noise) ratio.

For such synchronization, an USB (Universal Serial Bus) is sometimes used because of the cheap price thereof. Note that, Japanese Patent Application Laid-open No. 2006-30162 describes an imaging apparatus that starts imaging in response to a synchronizing signal received via the USB.

SUMMARY

However, using the USB to establish synchronization as such results in a long time to start USB transfer due to the characteristics of the USB, i.e., having a weak point of time control.

In view of the circumstances as described above, it is thus desirable to provide an imaging apparatus and a control method with which the entire processing is increased in speed.

An imaging apparatus according to an embodiment of the present disclosure includes a reception section, and an output section. The reception section is configured to receive a trigger from an external apparatus at a timing for reset and readout of an imaging element. The output section is configured to provide back, to the apparatus, a status indicating in which state the imaging element is when the reception section receives the trigger.

The apparatus may exert control also over an emission timing for a light source.

The output section may provide back the status to the apparatus also when the state of the imaging element is changed.

The trigger may include two types of triggers indicating the reset and the readout, and the imaging apparatus may further include a write section configured to write data from the imaging element to a memory when the trigger received by the reception section indicates the readout.

The imaging apparatus may further include a transmission section configured to start transmission of the data written in the memory when the write section starts writing of the data to the memory.

The transmission section may transmit the data written to the memory via a universal serial bus.

For continuous imaging for a plurality of frames, the trigger may indicate the readout for an n-th frame, and the reset for an n+1-th frame.

The imaging apparatus may further include a synchronizing signal issue section, and a mode transition section. The synchronizing signal issue section is configured to issue a synchronizing signal with respect to the imaging element. The mode transition section is configured to activate the imaging element in a low-current mode when the reception section receives the trigger, and after the synchronizing signal is issued by the synchronizing signal issue section, puts the activated imaging element back to the low-current mode.

A control method according to an embodiment of the present disclosure is an imaging apparatus control method, including: receiving a trigger from an external apparatus at a timing for reset and readout of an imaging element; and providing back to the apparatus a status indicating in which state the imaging element is when the trigger is received.

According to an embodiment of the present disclosure, a trigger from an external apparatus is received at the timing of reset and readout of an imaging element, and when the trigger is received, a status indicating in which state the imaging element is provided back to the apparatus.

According to an embodiment of the present disclosure, imaging is performed, and more specifically, the entire processing is increased in speed.

These and other objects, features and advantages of the present disclosure will become more apparent in light of the following detailed description of best mode embodiments thereof, as illustrated in the accompanying drawings.

BRIEF DESCRIPTION OF DRAWINGS

FIG. 11 is a block diagram showing an exemplary configuration of a computer.

DETAILED DESCRIPTION OF EMBODIMENT

Hereinafter, an embodiment of the present disclosure (hereinafter, simply referred to as embodiment) will be described.

[Exemplary Configuration of Microscope System]

Figure 1:
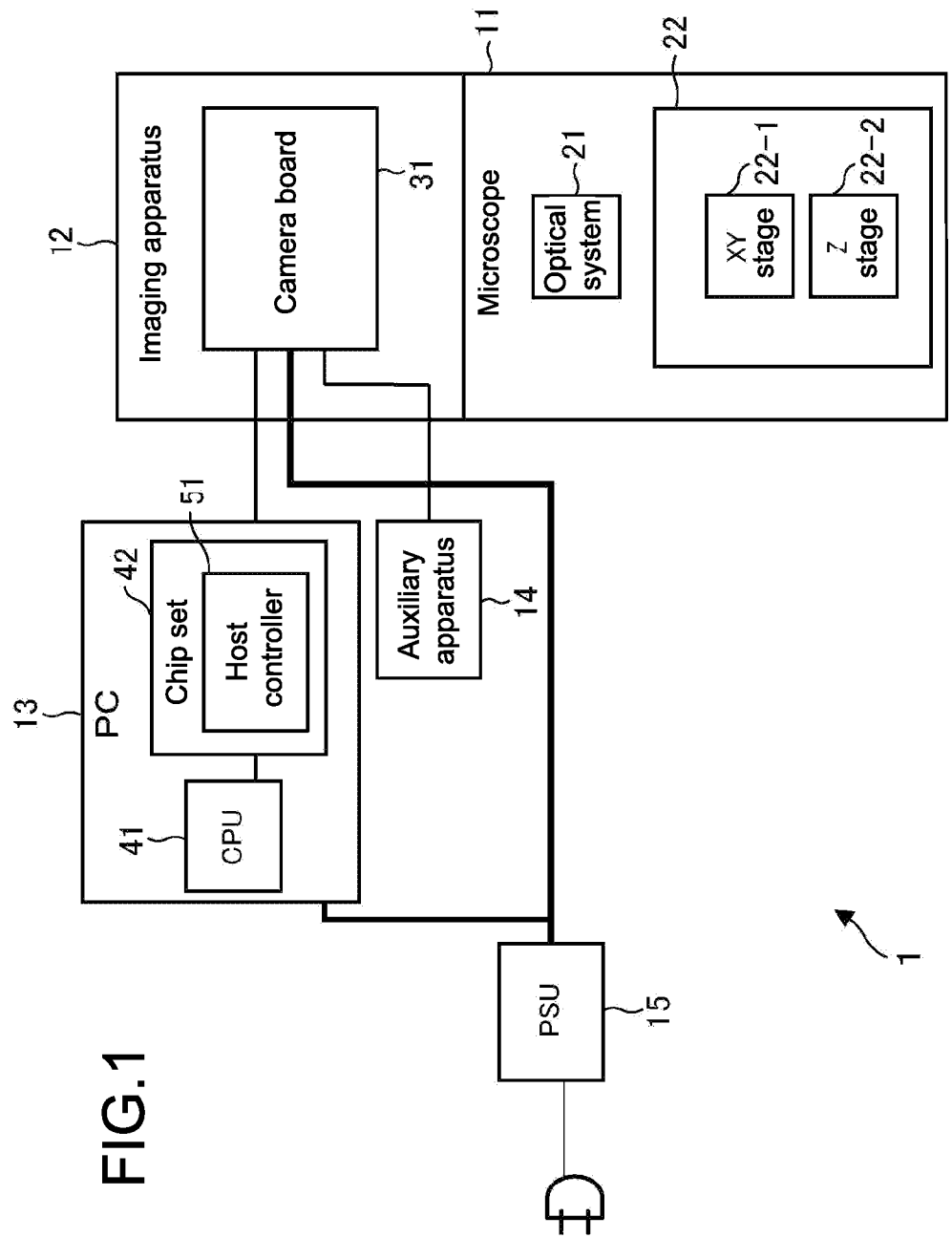
FIG. 1 is a block diagram showing an exemplary configuration of a microscope system applied with an embodiment of the present disclosure.

FIG. 1 is a diagram showing an exemplary configuration of a microscope system 1 applied with the embodiment of the present disclosure.

The microscope system 1 is configured to include a microscope 11, an imaging apparatus 12, a PC (Personal Computer) 13, an auxiliary apparatus 14, and a PSU (Power Supply Unit) 15.

The microscope 11 is configured by an optical system 21, and a stage 22. The optical system 21 is for forming an enlarged image of an observation specimen on, for example, the retinas of an observer or on an image sensor of the imaging apparatus 12. The stage 22 is for placement of the specimen. The stage 22 is configured by an XY stage 22-1, and a Z stage 22-2. The XY stage 22-1 moves relative to the optical system 21, i.e., parallel to the XY plane (e.g., horizontal plane), by the control of a CPU (Central Processing Unit) 41 of the PC 13, or in response to the operation of a wheel (not shown) by the observer. This moves the specimen placed on the stage 22 also parallel to the XY plane. The Z stage 22-2 moves relative to the optical system 21, i.e., parallel in the Z-axis direction (e.g., vertical direction) by the control of the CPU 41 of the PC 13, or in response to the operation of the wheel (not shown) by the observer. This moves the specimen on the stage 22 also parallel in the Z-axis direction.

That is, the observer may perceive the enlarged image of the specimen on the stage 22 via the optical system 21. In this case, in order to see the enlarged image of the specimen in focus on his or her own retinas, the observer operates the PC 13 or the wheel (not shown) to move the XY stage 22-1 and the Z stage 22-2. Through such an operation, the observer changes the relative position of the specimen with respect to the optical system 21 to an arbitrary position on the three-dimensional space.

When the imaging apparatus 12 is mounted to the microscope 11, for example, the imaging apparatus 12 is allowed to pick up an enlarged image of the specimen on the stage 22 via the optical system 21.

The imaging apparatus 12 is provided with a camera board 31 to which an imager (an imager 112 of FIG. 2 to be described later) is partially formed or mounted. The camera board 31 is configured by a camera board for fluorescence detection use, for example. Under the control of the PC 13, the camera board 31 picks up an enlarged image of the specimen on the stage 22 via the optical system 21. At the time of imaging as such, the auxiliary apparatus 14 provides signals each being a trigger to various types of operations of the camera board 31.

The PC 13 is configured to include the CPU 41, and a chip set 42. The CPU 41 exerts control over the operation of the PC 13 in its entirety. The chip set 42 is under the control of the CPU 41, and is configured by a group of chips for execution of various types of processes. One of the chips is a host controller 51. This host controller 51 is in charge of remote control over devices connected via the USB (Universal Serial Bus). In this example, the host controller 51 picks up the enlarged image of the specimen as described above by exerting remote control over the USB-connected camera board 31.

The auxiliary apparatus 14 provides the signals each being a trigger to the various types of processes to both the light source and the camera board 31. This is for establishing synchronization between emission of the light source (a light source 101 of FIG. 2 to be described later) and the light exposure of the camera board 31.

The PSU (Power Supply Unit) 15 provides power to the components configuring the microscope system 1, e.g., the PC 13, and the camera board 31.

[Detailed Exemplary Configuration of Microscope System]

Figure 2:
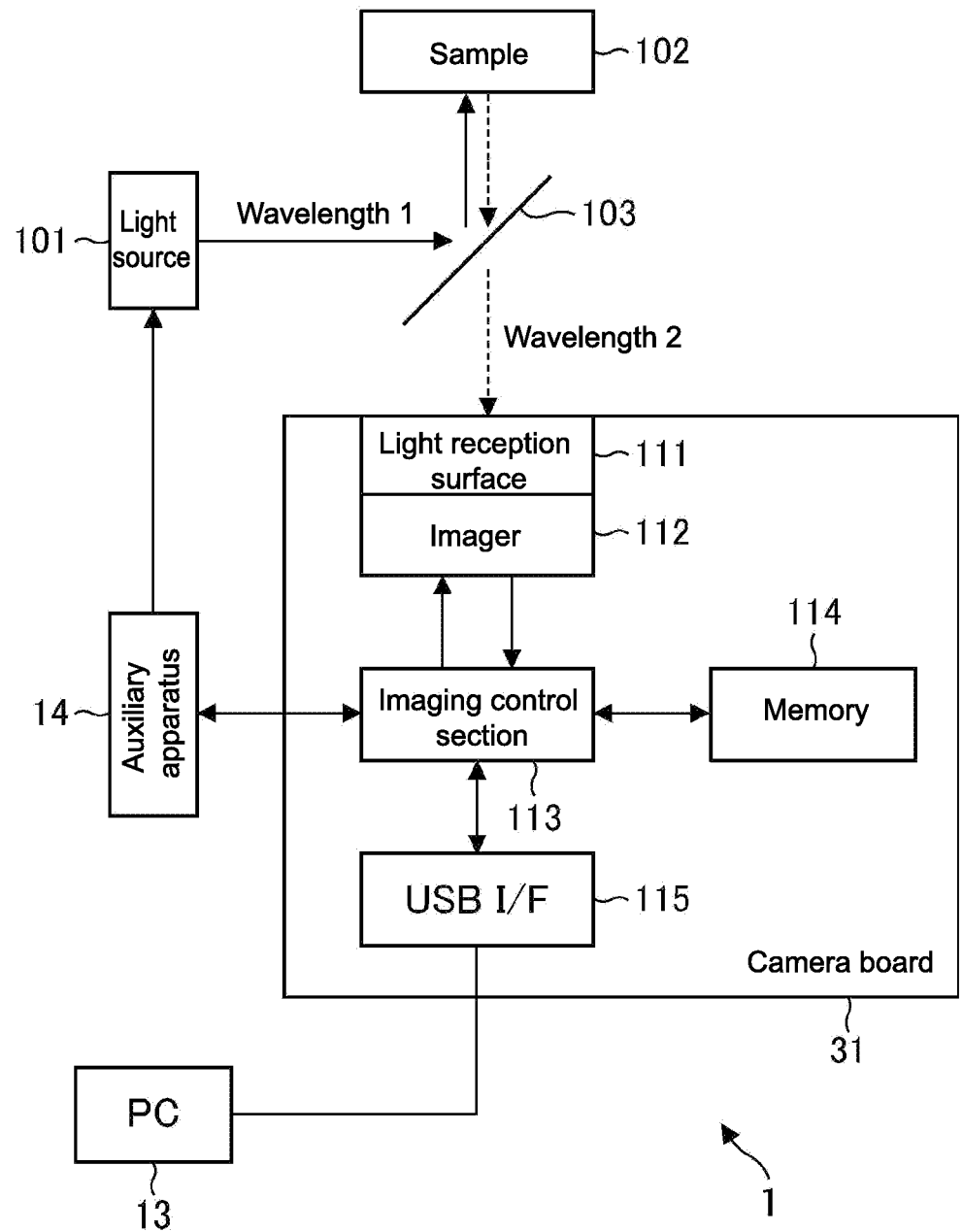
FIG. 2 is a block diagram showing the more detailed configuration of the microscope system of FIG. 1.

FIG. 2 is a block diagram showing the more detailed configuration of the microscope system.

FIG. 2 shows an example of the microscope system 1 including the light source 101, a sample 102, and a half mirror 103 in addition to the PC 13, the auxiliary apparatus 14, and the camera board 31.

The PC 13 (the host controller 51 thereof) exerts control over the camera board 31 via the USB to cause it to pick up images of the sample 102 for a plurality of times. The USB in use here is a USB 2.0, for example.

The auxiliary apparatus 14 provides the camera board 31 with the signals each being a trigger to the various types of operations thereof. The auxiliary apparatus 14 is provided, by the camera board 31, with a status signal, which is issued in accordance with the trigger signals. The auxiliary apparatus 14 causes the light source 101 to emit light based on the state of the camera board 31 indicated by the status signal.

The light source 101 emits excitation light at the timing given by the auxiliary apparatus 14. The sample 102 is an object for imaging, and configures the specimen of FIG. 1. The half mirror 103 reflects light with a predetermined wavelength, e.g., wavelength 1, and is configured by a filter or others that pass through light with any other predetermined wavelength, e.g., wavelength 2.

The excitation light from the light source 101, i.e., light with the wavelength 1, is reflected by the half mirror 103 being a component of the optical system 21, and the sample 102 is irradiated therewith. The light is changed in wavelength after the reflection on the sample 102, i.e., changed to the wavelength 2. The light with the wavelength 2 as such passes through the half mirror 103 after the reflection on the sample 102, and then is received by a light reception surface 111 of the camera board 31.

The camera board 31 is configured to include the light reception surface 111, the imager 112, an imaging control section 113, a memory 114, and a USB I/F (Interface) 115.

The light reception surface 111 receives the irradiated light. The imager 112 is configured by a solid imaging element such as a CMOS (Complementary Metal Oxide Semiconductor). Alternatively, the imager 112 may be configured by a CCD (Charge Coupled Device). The imager 112 detects the irradiated light on the light reception surface 111, and outputs the detection result as data to the imaging control section 113.

The imaging control section 113 is configured by an FPGA (Field Programmable Gate Array), an IC (Integrated Circuit), or others. The imaging control section 113 receives a control signal from the PC 13 via the USB I/F 115, and in response thereto, starts imaging of the sample 102.

In response to the trigger signals (hereinafter, simply referred also to as triggers) from the auxiliary apparatus 14, the imaging control section 113 issues a status signal indicating the state of the imager 112, and provides the status signal to the auxiliary apparatus 14 for imaging by the imager 112. Also in response to the triggers from the auxiliary apparatus 14, the imaging control section 113 performs writing of data read from the imager 112 to the memory 114. The imaging control section 113 outputs the written data to the USB I/F 115 for transfer to the PC 13.

The memory 114 is configured by a DDR2 (Double Data Rate 2) SDRAM (Synchronous Dynamic Random Access Memory), for example. Under the control of the imaging control section 113, the memory 114 stores the data from the imager 112.

The USB I/F 115 provides the control signal from the PC 13 to the imaging control section 113. Under the control of the imaging control section 113, the USB I/F 115 transfers the data (images) written in the memory 114 to the PC 13.

[Exemplary Configuration of Imaging Control Section]

Figure 3:
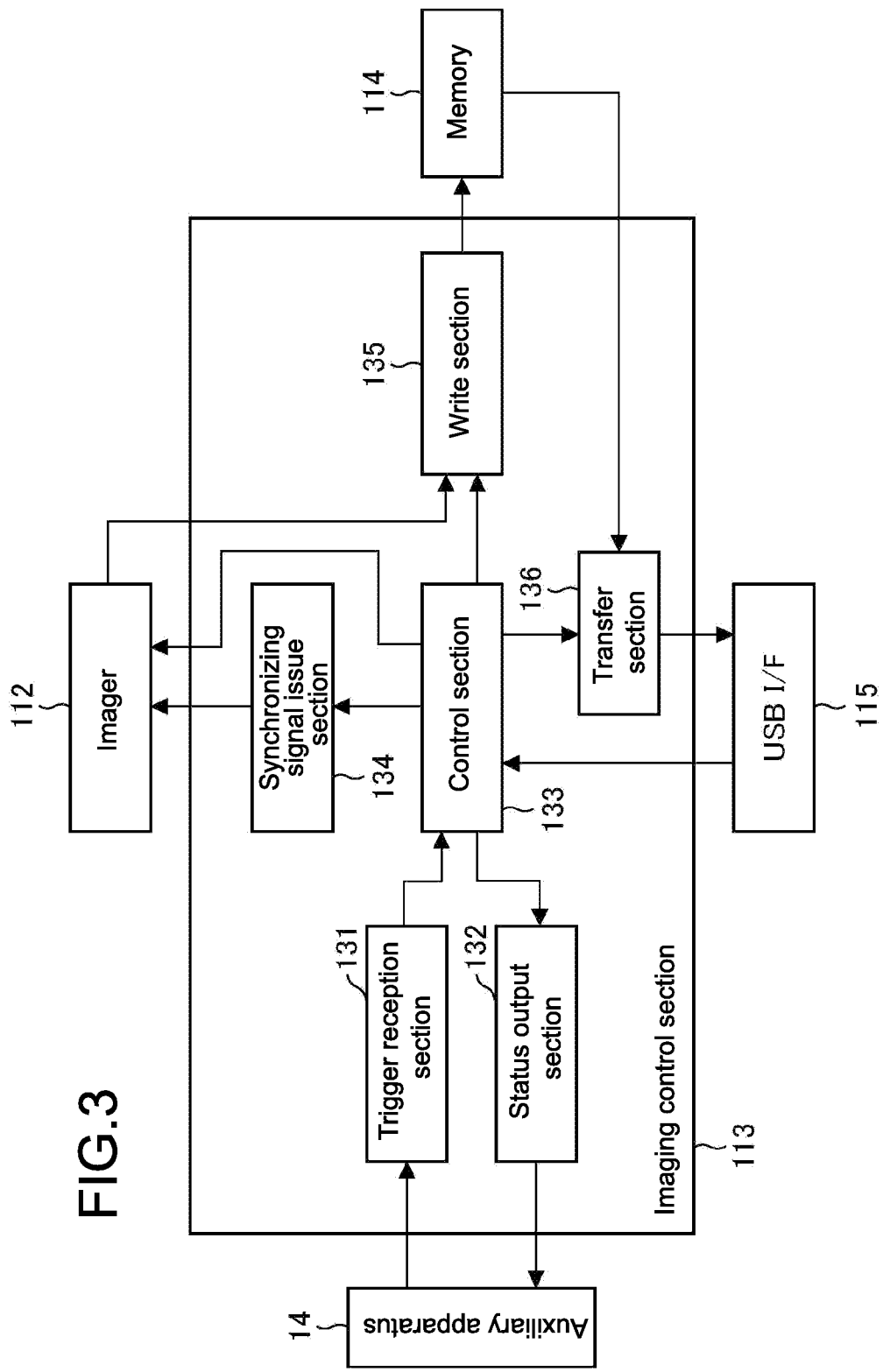
FIG. 3 is a block diagram showing the configuration of an imaging control section.

FIG. 3 is a block diagram showing the configuration of the imaging control section.

In the example of FIG. 3, the imaging control section 113 is configured to include a trigger reception section 131, a status output section 132, a control section 133, a synchronizing signal issue section 134, a write section 135, and a transfer section 136.

The trigger reception section 131 receives the triggers from the auxiliary apparatus 14, and provides those to the control section 133. The status output section 132 outputs a status signal from the control section 133 to the auxiliary apparatus 14.

The control section 133 receives the control signal from the PC 13 via the USB I/F 115, and starts imaging of the sample 102. In response to the triggers provided by the trigger reception section 131, the control section 133 checks the state of the imager 112, and issues a status signal indicating that the imager 112 is not yet ready, i.e., in the preparation state. The control section 133 then provides the status signal to the status output section 132. The triggers are each a signal type indicating reset or readout of the imager 112.

When the incoming trigger is a reset-indicating signal, the control section 133 issues a status signal indicating that the imager 112 is yet in the preparation state, and provides it to the auxiliary apparatus 14. The control section 133 then causes the synchronizing signal issue section 134 to issue a synchronizing signal for reading of data captured in each imaging element of the imager 112 for reset. When such reset of the imaging elements is completed up to the last line, the imager 112 is put in the state ready for light exposure. When the imager 112 is in the ready state as such, the control section 133 issues a status signal indicating that the imager 112 is now in the ready state, and provides it to the auxiliary apparatus 14. Upon reception of this status signal, the auxiliary apparatus 14 accordingly causes the light source 101 to emit light responding to the status signal indicating that the imager 112 is now ready. As such, the light exposure is started in the imager 112.

When the incoming trigger is a readout-indicating signal, the control section 133 issues a status signal indicating that the imager 112 is yet in the preparation state, and provides it to the auxiliary apparatus 14. The control section 133 then causes the synchronizing signal issue section 134 to issue a synchronizing signal for reading of data captured in each of the imaging elements of the imager 112 for reset. The control section 133 also exerts control over the write section 135 for writing of data to the memory 114, and exerts control over the transfer section 136 to transfer the data to the PC 13. The data herein is the one read from each of the imaging elements of the imager 112. When such reset of the imaging elements is completed up to the last line, the imager 112 is in the ready state as such. When the imager 112 is put in the state ready for light exposure as such, the control section 133 issues a status signal indicating that the imager 112 is now ready, and provides it to the auxiliary apparatus 14.

Herein, when imaging is continuously performed for a plurality of frames, the trigger being a readout signal indicates also reset for the next imaging. As such, in this case, at the same time to start data writing to the memory 114 and data transfer to the PC 13, the auxiliary apparatus 14 having received a status signal indicating that the imager 112 is now ready causes the light source 101 to emit light. In response thereto, the light exposure in the imager 112 is started.

Under the control of the control section 133, the synchronizing signal issue section 134 issues a vertical synchronizing signal and a horizontal synchronizing signal with respect to the imager 112. Also under the control of the control section 133, the write section 135 performs writing of data to the memory 114, which is read from each of the imaging elements of the imager 112. Also under the control of the control section 133, the transfer section 136 performs transfer of data to the PC 13 via the USB I/F 115, starting from the data written in the memory 114.

[Exemplary Previous Timing Diagram]

Figure 4:
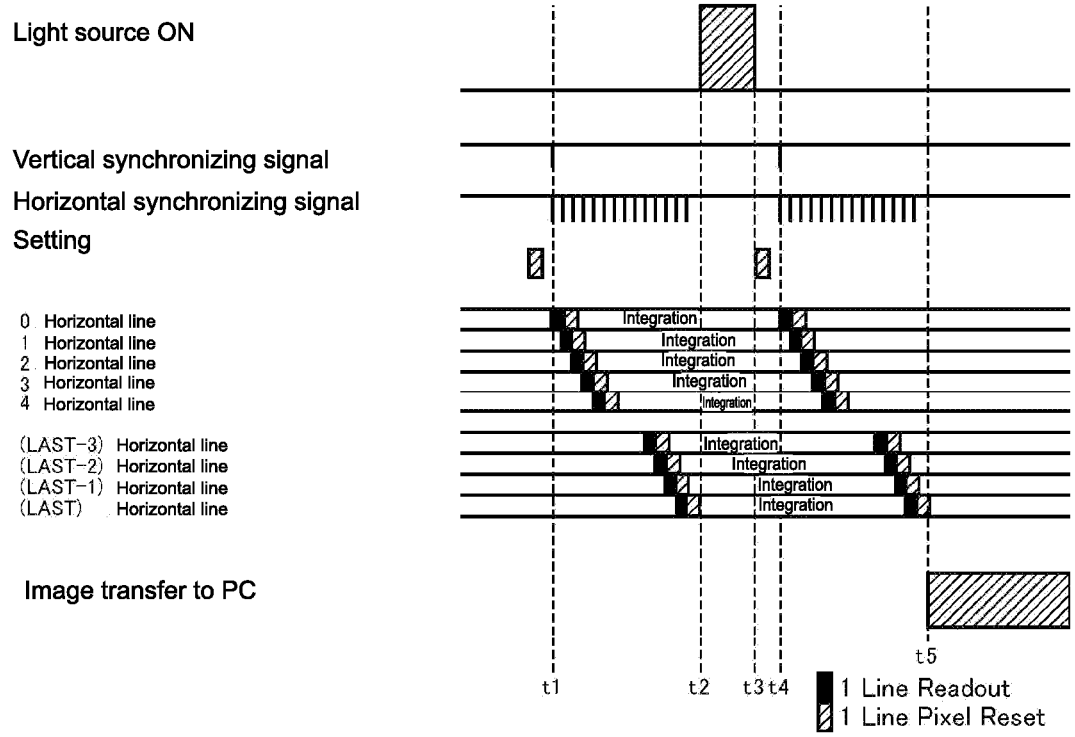
FIG. 4 is a timing diagram of a previous imaging process.

By referring to the timing diagram of FIG. 4, described next is an imaging process for a previous imaging apparatus for a comparison with the present disclosure. FIG. 4 shows the timing diagram for imaging and transfer by the previous imaging apparatus.

FIG. 4 shows an example of the timings for, in order from the above, the turning-ON of a light source, a vertical synchronizing signal, a horizontal synchronizing signal, the setting of an imager, horizontal lines from 0 to (LAST) each indicating the state of imaging elements, and the image transfer to a PC.

In the previous imaging apparatus, imaging has been controlled using a USB. As an example, in the previous imaging apparatus, the vertical and horizontal synchronizing signals are issued at a timing t1 subsequent to the completion of the setting of the imager, and after the timing t1, the imaging elements on the horizontal lines of the imager are each subjected to read and reset. The integration in each of the imaging elements indicates the integration and storage of the received data after the reset.

At a timing t2 after the completion of the reset of the imaging elements on the last horizontal line, the light source is turned ON so that light exposure is performed in the imager. At a timing t3 when the light source is turned OFF, in the previous imaging apparatus, a setting is made to the imager. Next, in the previous imaging apparatus, at a timing t4 subsequent to the completion of the setting of the imager, the vertical and horizontal synchronizing signals are started to be issued so that the imaging elements on each of the horizontal lines of the imager are each subjected to read and reset.

In the previous imaging apparatus, at a timing t5 after the completion of reset of the imaging elements on the last horizontal line, image transfer to the PC 13 is finally started via the USB.

As described above, to establish synchronization between the light source of the camera board with no external shutter and the light exposure of the camera, the USB being cheap and with low power consumption has been previously used to generate a trigger by a PC or others under the control of software.

However, the USB has a weak point of time control. This causes a difficulty in timing control with a precision, thereby causing a timing delay. Therefore, as described above by referring to FIG. 4, until the completion of read and reset of the imaging elements on the horizontal lines of the imager, the image transfer to the PC is difficult, thereby resulting in a slow processing speed. Moreover, because the transfer speed by the USB is not fast, when the trigger comes at the same time as the data transfer, the data transfer is expected to be completed first.

In consideration thereof, in the microscope system 1, the auxiliary apparatus 14 provides a hardware trigger to the camera board 31, thereby exerting control over the operations of the camera board 31. This accordingly shortens the total processing time (enhance the throughput) in the camera board 31, thereby making up for the weak point of the USB in terms of the transfer speed. As such, even if the cheap USB is in use, the entire processing is favorably increased in speed.

[Exemplary Timing Diagram]

Figure 5:
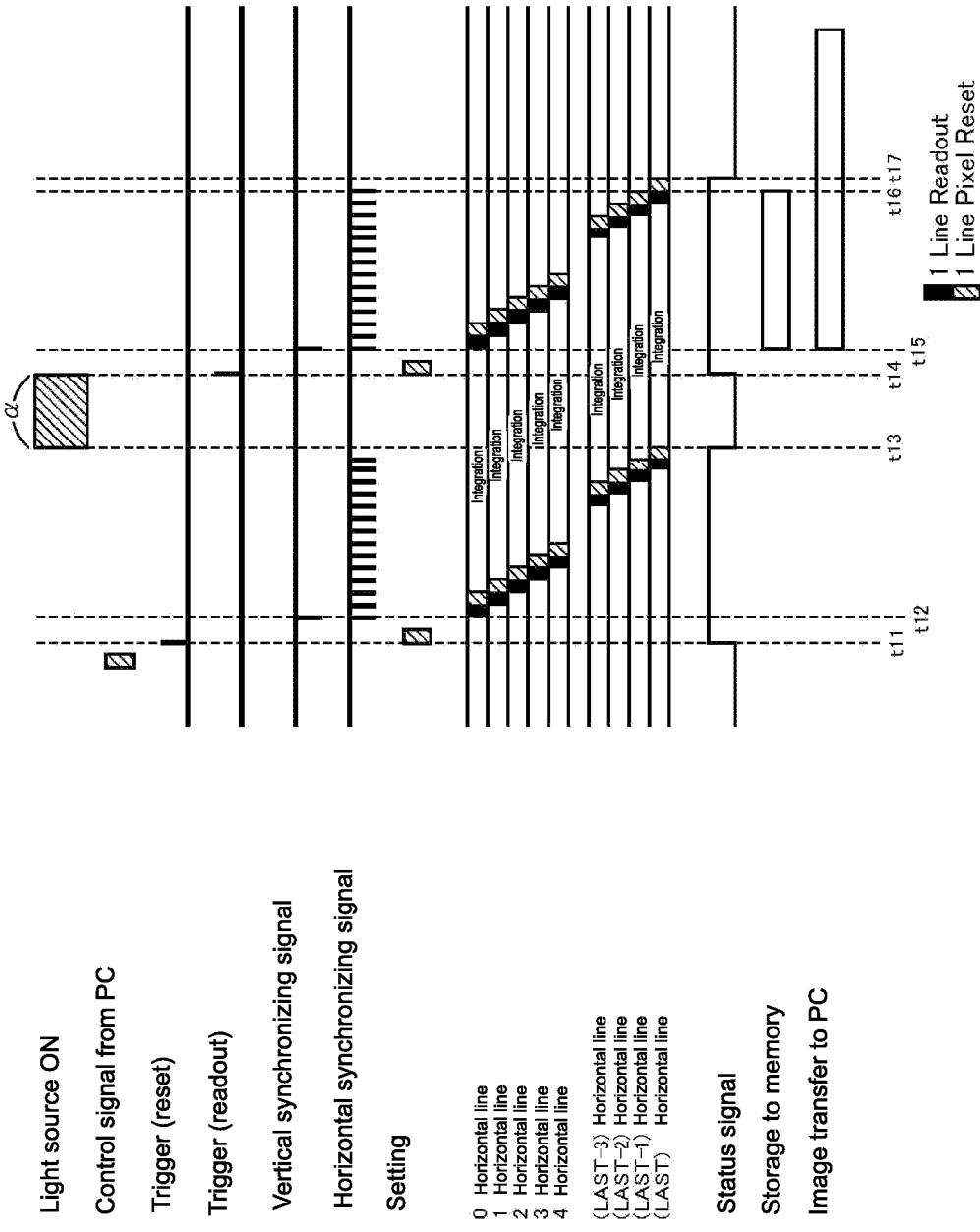
FIG. 5 is a timing diagram of an imaging process according to the embodiment of the present disclosure.

FIG. 5 shows a timing diagram for the imaging apparatus 12.

FIG. 5 shows an example of the timings for, in order from the above, the turning-ON of the light source, a control signal from the PC 13, a trigger (reset) and a trigger (readout) from the auxiliary apparatus 14, a vertical synchronizing signal, a horizontal synchronizing signal, and the setting of the imager. FIG. 5 also shows an example of the timings for the horizontal lines from 0 to (LAST), a status signal to the auxiliary apparatus 14, the data storage to the memory 114, and the image transfer to the PC 13.

The timing for the turning-ON of the light source indicates the timing when the light source 101 is in the ON state (during light emission). The control signal from the PC 13 indicates the timing when the control section 133 receives an imaging control signal from the PC 13 via the USB I/F 115. The timing for the trigger (reset) and that for the trigger (readout) each indicate the timing when the control section 133 receives the triggers from the auxiliary apparatus 14.

The timing for the vertical synchronizing signal and that for the horizontal synchronizing signal indicate the timing when the synchronizing signal issue section 134 issues the respective signals. The timing for the setting indicates the time taken for the control section 133 to make various settings of the imager 112.

The timings for the horizontal lines from 0 to (LAST) each indicate the timing for the operation state of each imaging element. The solid portion of each of the lines indicates the state of one-line-readout, and the hatched portion thereof indicates that the imaging elements on one line are being reset. The integration in each of the lines indicates the integration and storage of the received data after the reset.

A status signal in the high (High) state indicates that the imager 112 is yet in the preparation state, and a status signal in the low (Low) state indicates that the imager 112 is in the ready state. The rising of a status signal indicates the timing when the imager 112 is put in the preparation state, and at this timing, the control section 133 outputs, to the auxiliary apparatus 14, a status signal indicating that the imager 112 is in the preparation state. On the other hand, the falling of a status signal indicates the timing when the imager 112 becomes ready, and at this timing, the control section 133 outputs, to the auxiliary apparatus 14, a status signal indicating that the imager 112 is now in the ready state.

The storage to the memory 114 indicates the time taken for the storage of data to the memory 114, which is read from each of the imaging elements. The image transfer to the PC 13 indicates the time taken for transfer of data stored in the memory 114.

As an example, the control section 133 receives an imaging control signal from the PC 13 via the USB I/F 115. Thereafter, a reset trigger is issued by the auxiliary apparatus 14. The control section 133 receives the reset trigger via the trigger reception section 131. At the timing t11 of the trigger reception, the control section 133 outputs a status signal indicating that the imager 112 is in the preparation state to the auxiliary apparatus 14, and makes the setting of the imager 112.

At a timing t12 subsequent to the completion of the setting, the control section 133 causes the synchronizing signal issue section 134 to start issuing the synchronizing signal. In response to this synchronizing signal, the imaging elements of the imager 112 each start readout and reset of the horizontal lines from the 0-th line.

With the completion of reset of the last horizontal line of the imager 112, i.e., at a timing t13, to the auxiliary apparatus 14, the control section 133 outputs a status signal indicating that the imager 112 is now in the ready state. In response thereto, the auxiliary apparatus 14 causes the light source 101 to emit light for a predetermined length of time α. During this time, the light exposure is performed in the imager 112. Herein, the time for light emission may remain the same, but it may vary depending on the type of the sample, the light, or the filter, for example.

After the lapse of the predetermined length of time α, the auxiliary apparatus 14 turns off the light source 101, and issues a readout trigger. At this timing t14, to the auxiliary apparatus 14, the control section 133 outputs a status signal indicating that the imager 112 is in the preparation state, and makes the setting of the imager 112.

At a timing t15 subsequent to the completion of the setting, the control section 133 causes the synchronizing signal issue section 134 to start issuing the vertical and horizontal synchronizing signals. At this time, the control section 133 also exerts control over the write section 135 and the transfer section 136 to start writing of data to the memory 114, and start transfer of the written data to the PC 13.

In response to these synchronizing signals, the imaging elements of the imager 112 each start readout and reset of the horizontal lines from the 0-th line. The write section 135 performs writing of data to the memory 114, which is read from each of the imaging elements of the imager 112. The transfer section 136 does not wait for completion of data writing, and performs data transfer to the PC 13 starting from the data written in the memory 114.

With the completion of the readout of the last horizontal line of the imager 112, i.e., at a timing t16, the data writing to the memory 114 is also completed. Thereafter, with the completion of the reset of the last horizontal line of the imager 112, i.e., at a timing t17, the control section 133 outputs a status signal indicating that the imager 112 is now in the ready state to the auxiliary apparatus 14.

After the timing t17, the data transfer to the PC 13 is continuously performed until the data written to the memory 114 is completely transferred.

As such, from the auxiliary apparatus 14 exerting control also over the timing for light emission of the light source, a reset trigger and a readout trigger are received for the imager 112, and to the auxiliary apparatus 14, a status signal for the imager 112 is provided back.

This allows synchronization between the timing for light emission of the light source 101 and the timing for light exposure in the imager 112. As a result, the S/N ratio being the system characteristics of the imager 112 is to be increased.

This also allows the data transfer to the PC 13 not after the completion of data writing to the memory 114 but immediately with the data written to the memory 114. As a result, even if the transfer speed by the USB is slow considering the transfer speed of the memory 114, the total processing time may be reduced in comparison with the previous apparatus.

[Another Exemplary Timing Diagram]

Figure 6:
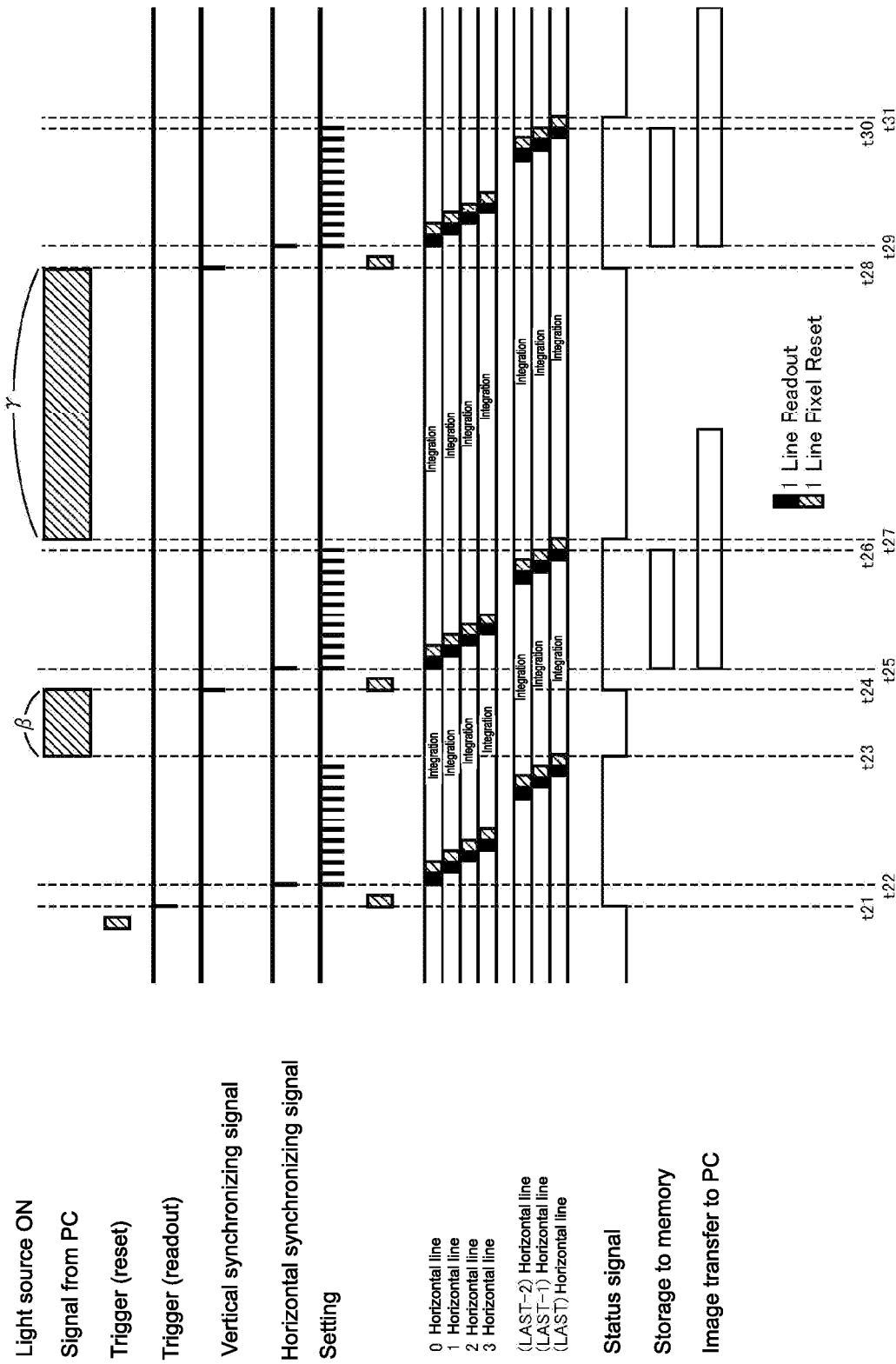
FIG. 6 is another timing diagram of the imaging process according to the embodiment of the present disclosure.

FIG. 6 shows a timing diagram for the imaging apparatus 12 when imaging is performed continuously for two frames.

FIG. 6 shows an example of the timings for, in order from the above, the turning-ON of the light source, a control signal from the PC 13, a trigger (reset) and a trigger (readout) from the auxiliary apparatus 14, a vertical synchronizing signal, a horizontal synchronizing signal, and the setting of the imager. FIG. 6 also shows an example of the timings for the horizontal lines from 0 to (LAST), a status signal to the auxiliary apparatus 14, the data storage to the memory 114, and the image transfer to the PC 13. Herein, the timings are similar to those in the example of FIG. 5, and thus are not described in detail again.

As an example, the control section 133 receives a control signal from the PC 13 for continuous imaging for two frames via the USB I/F 115. Thereafter, a reset trigger is issued by the auxiliary apparatus 14. The control section 133 receives the reset trigger via the trigger reception section 131. At the timing t21 of the trigger reception, the control section 133 outputs a status signal indicating that the imager 112 is in the preparation state to the auxiliary apparatus 14, and makes the setting of the imager 112.

At a timing t22 subsequent to the completion of the setting, the control section 133 causes the synchronizing signal issue section 134 to start issuing the vertical and horizontal synchronizing signals. In response to these synchronizing signals, the imaging elements of the imager 112 each start readout and reset of the horizontal lines from the 0-th line.

With the completion of reset of the last horizontal line of the imager 112, i.e., at a timing t23, the control section 133 outputs a status signal indicating that the imager 112 is now in the ready state to the auxiliary apparatus 14. In response thereto, the auxiliary apparatus 14 causes the light source 101 to emit light for a predetermined length of time β. During this time, the light exposure is performed in the imager 112.

After the lapse of the predetermined length of time β, the auxiliary apparatus 14 turns off the light source 101, and issues a readout trigger. This trigger indicates readout for imaging for the first frame, and reset for imaging for the second frame. At the timing t24 of the trigger reception, the control section 133 outputs a status signal indicating that the imager 112 is in the preparation state to the auxiliary apparatus 14, and makes the setting of the imager 112.

At a timing t25 subsequent to the completion of the setting, the control section 133 causes the synchronizing signal issue section 134 to start issuing the synchronizing signal. At this time, the control section 133 also exerts control over the write section 135 and the transfer section 136 to start writing of data to the memory 114, and start transfer of the written data to the PC 13.

In response to this synchronizing signals, the imaging elements of the imager 112 each start readout and reset of the horizontal lines from the 0-th line. The write section 135 then performs writing of data to the memory 114, which is read from each of the imaging elements of the imager 112. The transfer section 136 does not wait for completion of data writing, and performs data transfer to the PC 13 starting from the data written in the memory 114.

With the completion of the readout of the last horizontal line of the imager 112, i.e., at a timing t26, the data writing to the memory 114 is also completed. Thereafter, with the completion of the reset of the last horizontal line of the imager 112, i.e., at a timing t27, the control section 133 outputs a status signal indicating that the imager 112 is now in the ready state to the auxiliary apparatus 14.

After the timing t27, the data transfer to the PC 13 is continuously performed until the data written to the memory 114 is completely transferred.

In response to the status signal indicating that the imager 112 is in the ready state, the auxiliary apparatus 14 causes the light source 101 to emit light for a predetermined length of time γ. Therefore, during this time, the light exposure is performed in the imager 112.

After the lapse of the predetermined length of time γ, the auxiliary apparatus 14 turns off the light source 101, and issues a readout trigger. Because this trigger is from the auxiliary apparatus 14, it may be received during the data transfer by the USB. At the timing t28 of the trigger reception, the control section 133 outputs a status signal indicating that the imager 112 is in the preparation state to the auxiliary apparatus 14, and makes the setting of the imager 112.

At a timing t29 subsequent to the completion of the setting, the control section 133 causes the synchronizing signal issue section 134 to start issuing the vertical and horizontal synchronizing signals. At this time, the control section 133 also exerts control over the write section 135 and the transfer section 136 to start writing of data to the memory 114, and start transfer of the written data to the PC 13.

In response to these synchronizing signals, the imaging elements of the imager 112 each start readout and reset of the horizontal lines from the 0-th line. The write section 135 then performs writing of data to the memory 114, which is read from each of the imaging elements of the imager 112. The transfer section 136 performs data transfer to the PC 13 starting from the data written in the memory 114.

With the completion of the readout of the last horizontal line of the imager 112, i.e., at a timing t30, the data writing to the memory 114 is also completed. Thereafter, with the completion of the reset of the last horizontal line of the imager 112, i.e., at a timing t31, the control section 133 outputs a status signal indicating that the imager 112 is in the ready state to the auxiliary apparatus 14.

After the timing t31, the data transfer to the PC 13 is continuously performed until the data written to the memory 114 is completely transferred.

As such, for continuous imaging for a plurality of frames, the trigger is shared for use, i.e., a readout trigger for the first frame is the same as a reset trigger for the second frame. This favorably reduces the processing time taken for trigger issuing. What is more, the triggers are to be received also during the data transfer to the PC 13 so that the total processing time is to be reduced.

Note that FIG. 6 shows an exemplary case of imaging performed continuously for two frames. However, the number of frames for imaging is not restrictive, and as long as the number is two or more, the processing is executed similarly.

[Procedure of Control Processing]

Figure 7:
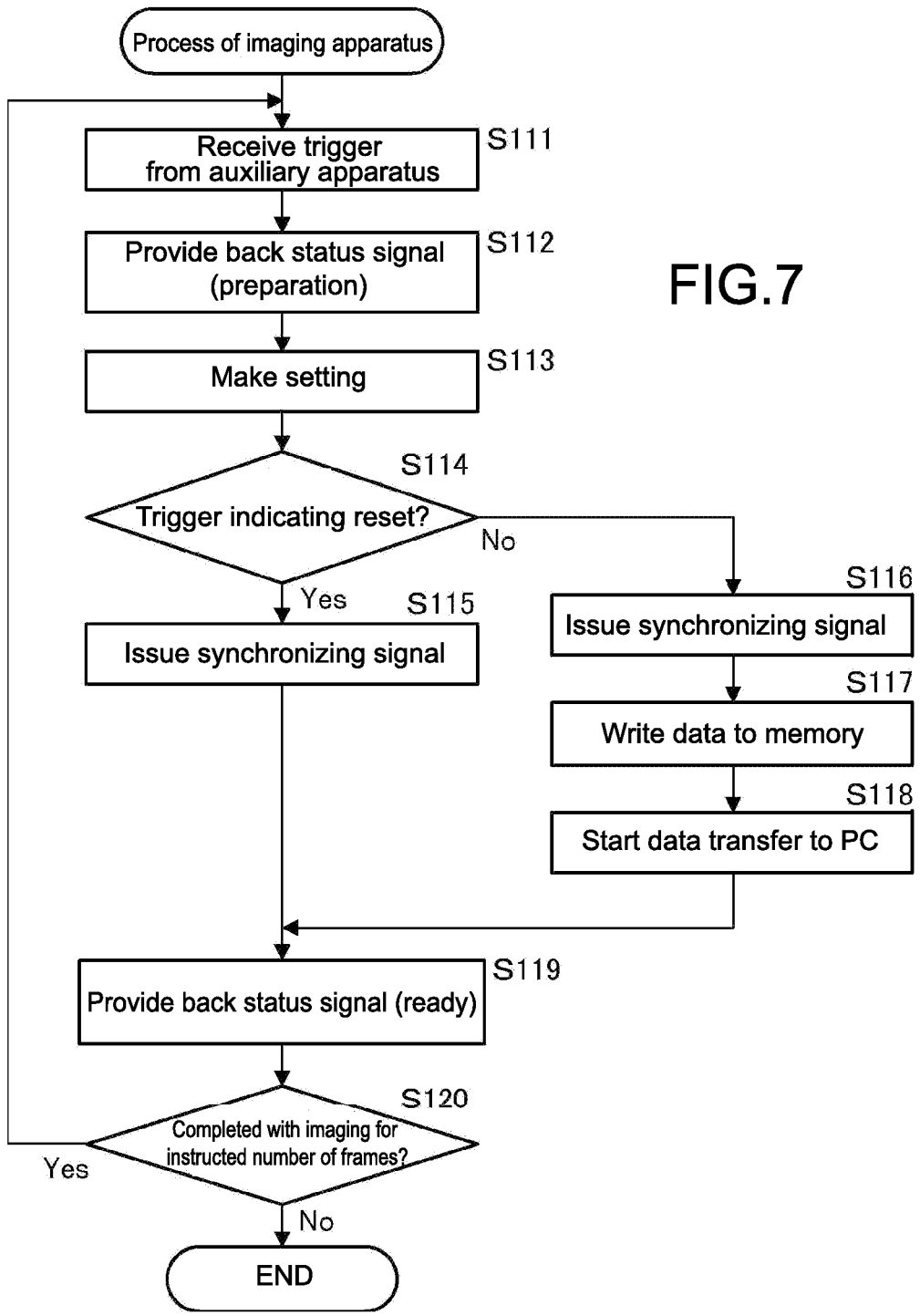
FIG. 7 is a flowchart of a control process for an imaging apparatus.

Described next is the procedure of a control process for the imaging apparatus 12 by referring to the flowchart of FIG. 7. This control process is started when an imaging control signal from the PC 13 is received via the USB.

The auxiliary apparatus 14 issues a trigger with respect to the imaging apparatus 12, and outputs the trigger to the trigger reception section 131.

In step S111, the control section 133 receives the trigger from the auxiliary apparatus 14 via the trigger reception section 131.

In step S112, the control section 133 provides back a status signal indicating that the imager 112 is in the preparation state to the auxiliary apparatus 14, and then in step S113, makes the setting of the imager 112.

In step S114, the control section 133 determines whether or not the trigger from the auxiliary apparatus 14 is a reset-trigger. When the control section 133 determines that the trigger is a reset-trigger, the procedure goes to step S115. In step S115, the control section 133 exerts control over the synchronizing signal issue section 134 to cause it to issue a synchronizing signal.

In response to this synchronizing signal, the imaging elements of the imager 112 each start readout and reset of the horizontal lines from the 0-th line.

On the other hand, in step S114, when the control section 133 determines that the trigger from the auxiliary apparatus 14 is a readout trigger, the procedure goes to step S116. In step S116, the synchronizing signal issue section 134 issues a synchronizing signal with respect to the imager 112.

In response to this synchronizing signal, the imaging elements of the imager 112 each start readout and reset of the horizontal lines from the 0-th line.

In step S117, the write section 135 performs writing of data to the memory 114, which is read from each of the imaging elements of the imager 112. In step S118, the transfer section 136 does not wait for completion of data writing, and performs data transfer to the PC 13 via the USB starting from the data written in the memory 114.

After the process of step S115 or S118, the procedure goes to step S119. With the completion of the readout and reset of the last horizontal line, the imager 112 is put in the ready state. In response thereto, after the completion of data writing to the memory 114, in step S119, the control section 133 outputs a status signal indicating that the imager 112 is now in the ready state to the auxiliary apparatus 14. Herein, in response thereto, when the imaging is not yet completely done, the auxiliary apparatus 14 causes the light source 101 to emit light.

In step S120, the control section 133 determines whether or not the imaging is completed for the number of frames instructed by the PC 13. When the control section 133 determines that the imaging for the instructed number of frames is not yet completely done, the procedure returns to step S111, and the processes thereafter are repeated.

That is, when the imaging is not yet completely done for the instructed number of frames, the auxiliary apparatus 14 turns off the light source 101, and issues a readout trigger. Accordingly, in step S111, the trigger from the auxiliary apparatus 14 is received, and the processes thereafter are repeated.

On the other hand, in step S120, when the control section 133 determines that the imaging is completed for the number of frames instructed by the PC 13, this is the end of the control process.

[Another Exemplary Configuration of Imaging Control Section]

Figure 8:
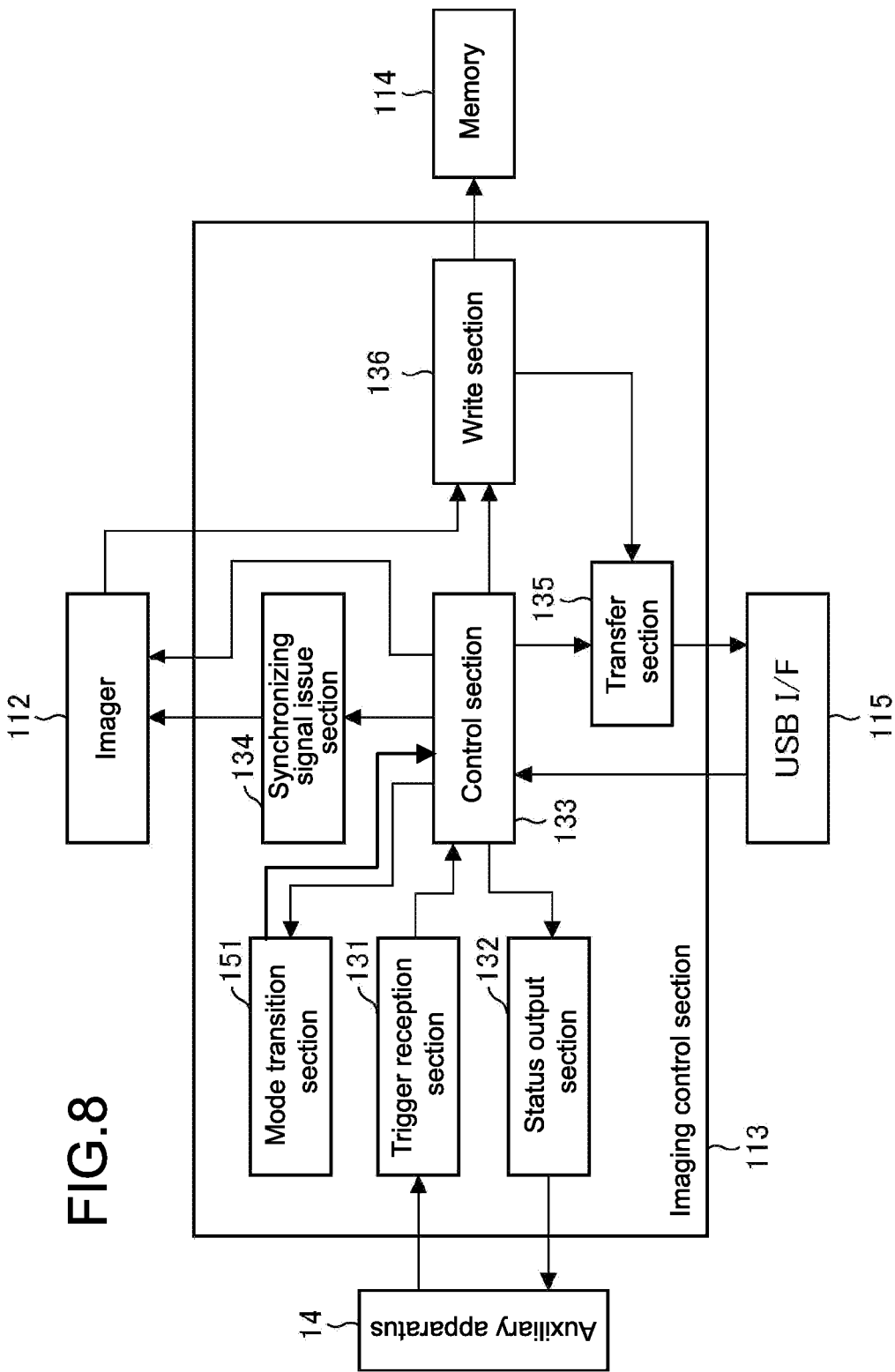
FIG. 8 is a block diagram showing another configuration of the imaging control section.

FIG. 8 is a block diagram showing another configuration of the imaging control section.

In the example of FIG. 8, the imaging control section 113 is configured to include the trigger reception section 131, the status output section 132, the control section 133, the synchronizing signal issue section 134, the write section 135, and the transfer section 136. Note that this configuration is similar to that of the imaging control section 113 of FIG. 3, and the components are not described in detail again if appropriate.

Unlike the imaging control section 113 of FIG. 3, the imaging control section 113 is configured to include a mode transition section 151.

The camera board 31 is in two modes of sleep and awake. In the sleep mode, the imager 112 operates at low current, and in the awake mode, the imager 112 operates at normal current. In the sleep mode, the imaging elements of the imager 112 do not perform reset and readout. As such, while being in the sleep mode, the imager 112 operates at low current, thereby reducing the thermal noise of the imager 112 during the sleep mode.

Upon reception of the trigger from the auxiliary apparatus 14, the control section 133 exerts control over the mode transition section 151 before issuing of the synchronizing signal, thereby activating the imager 112 in the sleep mode. After the issuing of the synchronizing signal, the control section 133 exerts control over the mode transition section 151 again, thereby putting the imager 112 back to the sleep mode.

Under the control of the control section 133, the mode transition section 151 activates the imager 112 in the sleep mode, or puts the imager 112 back to the sleep mode.

[Another Exemplary Timing Diagram]

Figure 9:
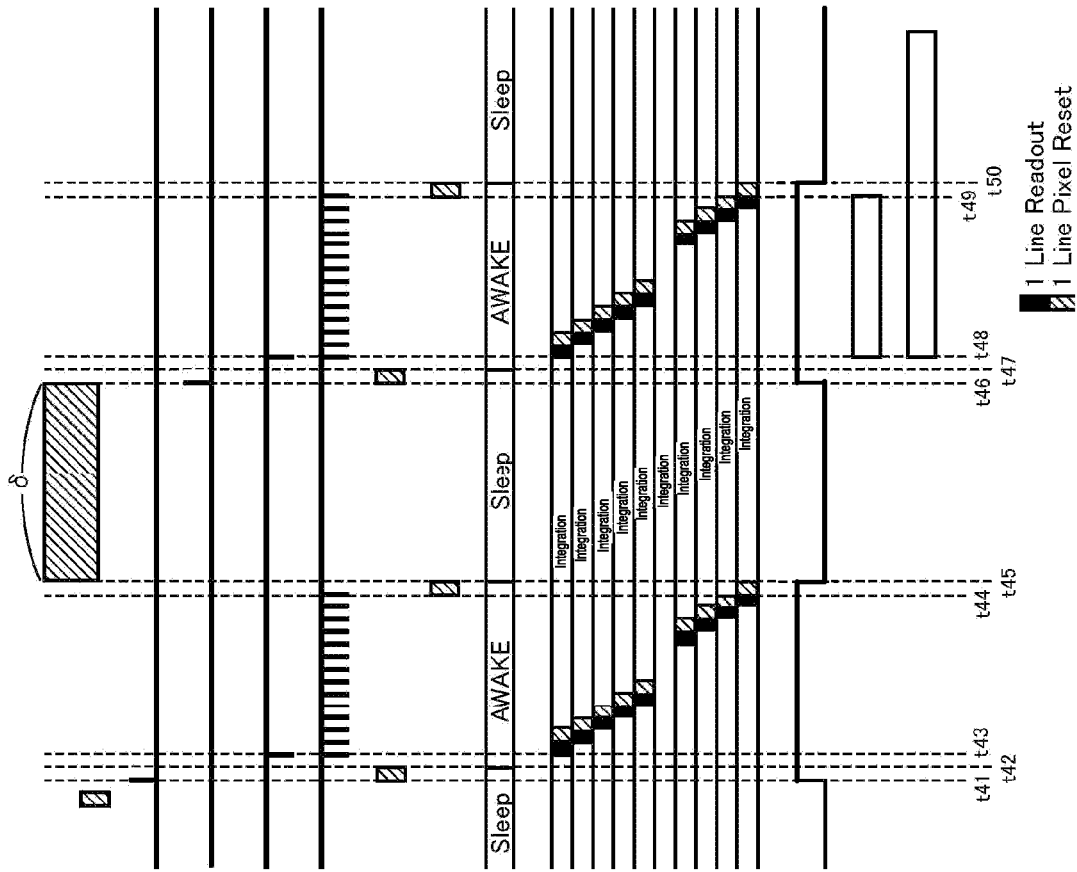
FIG. 9 is still another timing diagram of the imaging process according to the embodiment of the present disclosure.

FIG. 9 shows a timing diagram for the imaging apparatus 12 with the imaging control section 113 of FIG. 8.

FIG. 9 shows an example of the timings for, in order from the above, the turning-ON of the light source, a control signal from the PC 13, a trigger (reset) and a trigger (readout) from the auxiliary apparatus 14, a vertical synchronizing signal, and a horizontal synchronizing signal. FIG. 9 also shows an example of the timings for the setting (activation from the sleep mode), the setting (mode transition to sleep), the horizontal lines from 0 to (LAST), a status signal to the auxiliary apparatus 14, the data storage to the memory 114, and the image transfer to the PC 13.

Note that the timings other than the setting (activation from the sleep mode) and the setting (mode transition to sleep) are similar to those of the example of FIG. 5, and thus are not described in detail again.

The timing for the setting (activation from the sleep mode) indicates the time taken for the control section 133 to make various settings of the imager 112, and the time taken for the mode transition from sleep to awake.

The timing for the setting (mode transition to sleep) indicates the time taken for the control section 133 to make various settings of the imager 112, and the time taken for the mode transition from awake to sleep.

The mode indicates in which mode the imager 112 is. That is, the mode indicates the timing when the imager 112 is changed in mode from/to sleep to/from awake.

As an example, the control section 133 receives an imaging control signal from the PC 13 via the USB I/F 115. Thereafter, a reset trigger is issued by the auxiliary apparatus 14. At this time, the imager 112 is in the sleep mode. The control section 133 receives the reset trigger via the trigger reception section 131. At the timing t41 of the trigger reception, the control section 133 outputs a status signal indicating that the imager 112 is in the preparation state to the auxiliary apparatus 14. At this time, the control section 133 also makes the setting of the imager 112, and exerts control over the mode transition section 151 to activate the imager 112 in the sleep mode.

With the completion of the setting by the control section 133, i.e., at a timing t42, the imager 112 is changed in mode to awake. At a timing t43 subsequent thereto, the control section 133 starts causing the synchronizing signal issue section 134 to issue the vertical and horizontal synchronizing signals. In response to these synchronizing signals, the imaging elements of the imager 112 each perform reset and readout of the horizontal lines from the 0-th line.

With the completion of the readout of the last horizontal line of the imager 112, i.e., at a timing t44, the control section 133 makes the setting of the imager 112, and exerts control over the mode transition section 151 to put the imager 112 back to the sleep mode. With the completion of the setting by the control section 133, i.e., at a timing t45, the imager 112 is changed in mode to sleep. At this time, the imager 112 is completed with reset of the last horizontal line, and the control section 133 outputs a status signal indicating that the imager 112 is now in the ready state to the auxiliary apparatus 14. In response thereto, the auxiliary apparatus 14 causes the light source 101 to emit light for a predetermined length of time δ, and during this time, the light exposure is performed in the imager 112.

After the lapse of the predetermined length of time δ, the auxiliary apparatus 14 turns off the light source 101, and issues a readout trigger. At this timing t46, to the auxiliary apparatus 14, the control section 133 outputs a status signal indicating that the imager 112 is in the preparation state. At this time, the control section 133 makes the setting of the imager 112, and exerts control over the mode transition section 151 to activate the imager 112 in the sleep mode.

With the completion of the setting by the control section 133, i.e., at a timing t47, the imager 112 is changed in mode to awake. At a timing t48 subsequent thereto, the control section 133 starts causing the synchronizing signal issue section 134 to issue the vertical and horizontal synchronizing signals. At the same time, the control section 133 exerts control over the write section 135 and the transfer section 136 to start writing of data to the memory 114, and start transfer of the written data to the PC 13.

In response to these synchronizing signals, the imaging elements of the imager 112 each start readout and reset of the horizontal lines from the 0-th line. The write section 135 performs writing of data to the memory 114, which is read from each of the imaging elements of the imager 112. The transfer section 136 performs transfer of data to the PC 13 starting from the data written in the memory 114.

With the completion of the readout of the last horizontal line of the imager 112, i.e., at a timing t49, the data writing to the memory 114 is also completed. At this timing t49, the control section 133 makes the setting of the imager 112, and exerts control over the mode transition section 151 to put the imager 112 back to the sleep mode. With the completion of the reset by the control section 133, i.e., at a timing t50, the imager 112 is changed in mode to sleep. At this time, the imager 112 is completed with reset of the last horizontal line of the imager 112, and the control section 133 outputs a status signal indicating that the imager 112 is now in the ready state to the auxiliary apparatus 14.

After the timing t50, the transfer to the PC 13 is continuously performed until the data written to the memory 114 is completely transferred.

As such, upon reception of the trigger from the auxiliary apparatus 14, the imager 112 in the sleep mode is activated before issuing of a synchronizing signal, and after the issuing of the synchronizing signal, the imager 112 is put back to the sleep mode. This accordingly reduces the dark current noise (thermal noise) of the camera board 31, thereby increasing the system characteristics (S/N ratio).

[Procedure of Control Processing]

Figure 10:
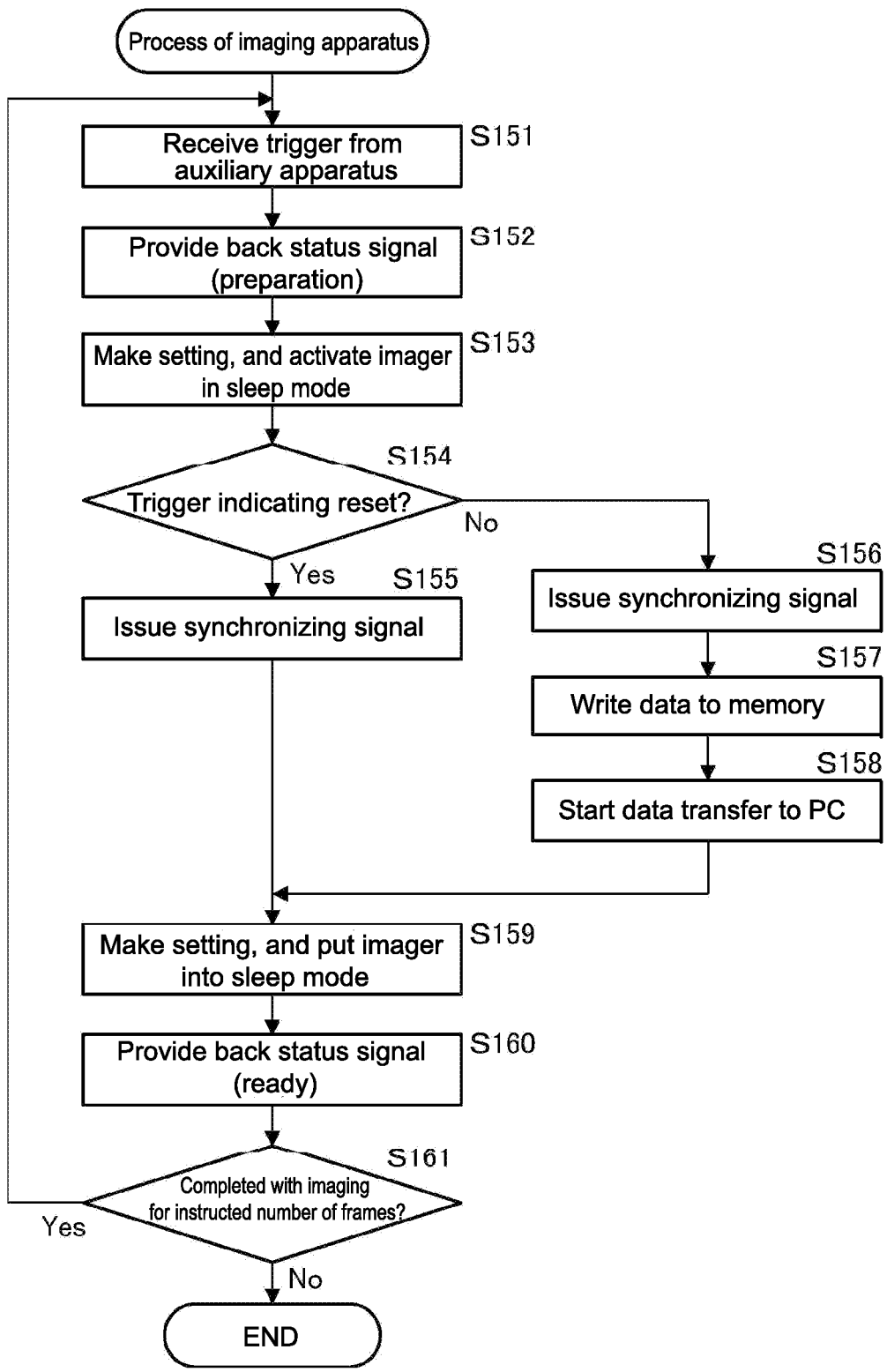
FIG. 10 is a flowchart of another control process for the imaging apparatus.

By referring to the flowchart of FIG. 10, described next is the procedure of a control process for the imaging apparatus 12 with the imaging control section 113 of FIG. 8. This control process is also started when an imaging control signal from the PC 13 is received via the USB.

The auxiliary apparatus 14 issues a trigger with respect to the imaging apparatus 12, and outputs the trigger to the trigger reception section 131.

In step S151, the control section 133 receives the trigger from the auxiliary apparatus 14 via the trigger reception section 131.

In step S152, the control section 133 outputs a status signal indicating that the imager 112 is in the preparation state to the auxiliary apparatus 14. In step S153, the control section 133 then makes the setting of the imager 112, and exerts control over the mode transition section 151 to activate the imager 112 in the sleep mode.

In step S154, the control section 133 determines whether or not the trigger from the auxiliary apparatus 14 is a reset-trigger. When the control section 133 determines that the trigger is a reset-trigger, the procedure goes to step S155. In step S155, the control section 133 exerts control over the synchronizing signal issue section 134 to cause it to issue a synchronizing signal.

In response to this synchronizing signal, the imaging elements of the imager 112 each start readout and reset of the horizontal lines from the 0-th line.

On the other hand, in step S154, when the control section 133 determines that the trigger from the auxiliary apparatus 14 is a readout trigger, the procedure goes to step S156. In step S156, the synchronizing signal issue section 134 issues a synchronizing signal with respect to the imager 112.

In response to this synchronizing signal, the imaging elements of the imager 112 each start readout and reset of the horizontal lines from the 0-th line.

In step S157, the write section 135 performs writing of data to the memory 114, which is read from each of the imaging elements of the imager 112. In step S158, the transfer section 136 starts transfer of data to the PC 13 via the USB, starting from the data written to the memory 114.

After the process of step S155 or S158, the procedure goes to step S159. With the completion of the readout and reset of the last horizontal line, the imager 112 is put in the ready state. In response thereto, after the completion of the data writing to the memory 114, in step S159, the control section 133 makes the setting of the imager 112, and exerts control over the mode transition section 151 to put the imager 112 back to the sleep mode.

In step S160, the control section 133 outputs a status signal indicating that the imager 112 is now in the ready state to the auxiliary apparatus 14. In response thereto, when the imaging is not yet completely done, the auxiliary apparatus 14 causes the light source 101 to emit light.

In step S161, the control section 133 determines whether or not the imaging is completed for the number of frames instructed by the PC 13. When the control section 133 determines that the imaging for the instructed number of frames is not yet completely done, the procedure returns to step S151, and the processes thereafter are repeated.

That is, when the imaging for the instructed number of frames is not yet completely done, the auxiliary apparatus 14 turns off the light source 101, and issues a readout trigger. Therefore, in step S151, the trigger from the auxiliary apparatus 14 is received, and the processes thereafter are repeated.

On the other hand, in step S161, when the control section 133 determines that the imaging is completed for the number of frames instructed by the PC 13, this is the end of the control process.

As such, from the auxiliary apparatus 14 exerting control also over the timing for light emission of the light source, a reset trigger and a readout trigger are received for the imager 112, and to the auxiliary apparatus 14, a status signal for the imager 112 is provided back.

This allows synchronization between the timing for light emission of the light source 101 and the timing for light exposure in the imager 112. As a result, the system characteristics of the imager 112, i.e., S/N ratio, are to be increased.

This also allows the data transfer to the PC 13 not after the completion of data writing to the memory 114 but immediately with the data written to the memory 114. As a result, even if the transfer speed by the USB is slow, the total processing time may be reduced in comparison with the previous apparatus.

Further, for continuous imaging for a plurality of frames, the trigger is shared for use, i.e., a readout trigger for the first frame is the same as a reset trigger for the second frame. This favorably reduces the processing time taken for trigger issuing.

Still further, the imager 112 in the sleep mode is activated before issuing of a synchronizing signal, and after the issuing of the synchronizing signal, the imager 112 is put back to the sleep mode. This accordingly reduces the dark current noise of the camera board 31.

Note here that exemplified in the above is the case of timing control over the light emission of the light source, and the operation of the camera board in the auxiliary apparatus 14. Alternatively, the auxiliary apparatus 14 may be incorporated in the PC 13 as a board. That is, the effect similar to that of the system described above may be produced by receiving data from the imaging apparatus 12 via the USB, and by issuing triggers to the imaging apparatus 12 not by the USB but by any other interface.

The procedure described above may be performed by hardware or by software. When the procedure is performed by software, a program configuring the software may be installed, from a program recording medium, into a computer incorporated into specifically designed hardware, a general-purpose computer capable of executing various functions by installing various types of programs therein, and others.

[Exemplary Configuration of Computer]

FIG. 11 shows an exemplary hardware configuration of a computer that performs the procedure described above by running a program.

A CPU (Central Processing Unit) 201 executes various processes by running a program stored in a ROM (Read Only Memory) 202 or in a storage section 208. A RAM (Random Access Memory) 203 stores the program to be run by the CPU 201, data, and others as appropriate. These components, i.e., the CPU 201, the ROM 202, and the RAM 203, are connected together via a bus 204.

The CPU 201 is also connected with an input/output interface 205 via the bus 204. The input/output interface 205 is connected with an input section 206, and an output section 207. The input section 206 is configured by a keyboard, a mouse, a microphone, and others, and the output section 207 is configured by a display, a speaker, and others. The CPU 201 executes various processes in response to commands coming from the input section 206. The CPU 201 outputs the processing results to the output section 207.

The storage section 208 connected to the input/output interface 205 is exemplified by a hard disk, and stores the program to be run by the CPU 201, and various types of data. A communication section 209 communicates with external devices over a network such as the Internet or a local area network.

Alternatively, the program may be acquired via the communication section 209, and stored in the storage section 208.

A drive 210 connected to the input/output interface 205 drives a disc, e.g., a magnetic disc, an optical disc, a magneto-optical disc, or a removable medium 211 exemplified by a semiconductor memory, when it is mounted thereto, and acquires programs, data, and others recorded thereon. The programs and data acquired as such are transferred to the storage section 208 as appropriate, and then are stored.

As shown in FIG. 11, a recording medium for installation to a computer and for recording (storage) of programs activated for running by the computer is configured by the removable medium 211, or the ROM 202 or a hard disk, for example. The removable medium 211 is a package medium exemplified by a magnetic disc (including a flexible disc), an optical disc (a CD-ROM (including Compact Disc-Read Only Memory), and a DVD (Digital Versatile Disc)), a magneto-optical disk (including an MD (Mini-Disc)), or a semiconductor memory. The ROM 202 stores the program temporarily or permanently, and the hard disk configures the storage section 208. For recording of the program to such a recording medium, as appropriate, a wired or radio communication medium such as the local area network, the Internet, and digital satellite broadcasting is used via the communication section 209 being the interface of a router, a modem, or others.

It should be noted herein that the steps for describing a series of steps above include not only the processes to be executed sequentially in the described order but also the processes to be executed not necessarily sequentially but concurrently or discretely.

While the present disclosure has been described in detail, the foregoing description is not limited to the embodiment described above. It is understood that numerous other modifications and variations are to be devised without departing from the gist of the present disclosure.

As such, the suitable embodiment of the present disclosure has been described by referring to the accompanying drawings, but the foregoing description is not restrictive to the embodiment. It is apparent to those skilled in the art to devise various modifications and variations without departing from the technical idea described in the section "What is claimed is" of this specification, and the devised modifications and variations are surely understood as being within the technical scope of the present disclosure.

The present disclosure is also in the following structures.

(1) An imaging apparatus, including:

an reception section configured to receive a trigger from an external apparatus at a timing for reset and readout of an imaging element; and an output section configured to provide back, to the apparatus, a status indicating in which state the imaging element is when the reception section receives the trigger.

(2) The imaging apparatus according to (1), in which the apparatus exerts control also over an emission timing for a light source.

(3) The imaging apparatus according to (1) or (2), in which the output section provides back the status to the apparatus also when the state of the imaging element is changed.

(4) The imaging apparatus according to any one of (1) to (3), in which the trigger includes two types of triggers indicating the reset and the readout, the imaging apparatus further including a write section configured to write data from the imaging element to a memory when the trigger received by the reception section indicates the readout.

(5) The imaging apparatus according to (4), further including a transmission section configured to start transmission of the data written in the memory when the write section starts writing of the data to the memory.

(6) The imaging apparatus according to (5), in which the transmission section transmits the data written to the memory via a universal serial bus.

(7) The imaging apparatus according to any one of (1) to (6), in which for continuous imaging for a plurality of frames, the trigger indicates the readout for an n-th frame, and the reset for an n+1-th frame.

(8) The imaging apparatus according to any one of (1) to (7), further including:

a synchronizing signal issue section configured to issue a synchronizing signal with respect to the imaging element; and a mode transition section configured to activate the imaging element in a low-current mode when the reception section receives the trigger, and after the synchronizing signal is issued by the synchronizing signal issue section, puts the activated imaging element back to the low-current mode.

(9) An imaging apparatus control method, including:

receiving a trigger from an external apparatus at a timing for reset and readout of an imaging element; and providing back to the apparatus a status indicating in which state the imaging element is when the trigger is received.

The present disclosure contains subject matter related to that disclosed in Japanese Priority Patent Application JP 2011-194830 filed in the Japan Patent Office on Sep. 7, 2011, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus, comprising:
an imaging element configured to generate a data in response to an irradiated light;
a reception section configured to receive a timing trigger from a first external apparatus at a timing for reset and readout, respectively, of the imaging element, the timing trigger received via a first link, wherein the timing trigger controls an imaging operation of the imaging element;
an output section configured to provide back, to the first external apparatus, a status indicating in which state the imaging element is when the reception section receives the timing trigger; and
an interface configured to transmit the data from the imaging element to a second external apparatus different from the first external apparatus via a second link different from the first link,
wherein the reception section is configured to receive and process the timing trigger from the first external apparatus at the same time that the interface transmits the data to the second external apparatus.

2. The imaging apparatus according to claim 1, wherein the first external apparatus exerts control also over an emission timing for a light source.

3. The imaging apparatus according to claim 1, wherein the output section provides back the status to the first external apparatus also when the state of the imaging element is changed.

4. The imaging apparatus according to claim 1, wherein the timing trigger includes two types of triggers indicating the reset and the readout,
the imaging apparatus further comprising a write section configured to write the data from the imaging element to a memory when the timing trigger received by the reception section indicates the readout.

5. The imaging apparatus according to claim 4, further comprising
a transmission section configured to start transmission, via the second link, of the data written in the memory when the write section starts writing of the data to the memory.

6. The imaging apparatus according to claim 5, wherein the second link is a universal serial bus.

7. The imaging apparatus according to claim 1, wherein for continuous imaging for a plurality of frames, the timing trigger indicates the readout for an n-th frame, and the reset for an n+1-th frame.

8. The imaging apparatus according to claim 1, further comprising:
a synchronizing signal issue section configured to issue a synchronizing signal with respect to the imaging element; and
a mode transition section configured to activate the imaging element in a low-current mode when the reception section receives the timing trigger, and after the synchronizing signal is issued by the synchronizing signal issue section, puts the activated imaging element back to the low-current mode.

9. An imaging apparatus control method, comprising:
receiving a timing trigger via a first link from a first external apparatus at a timing for reset and readout, respectively, of an imaging element, the imaging element generating a data in response to an irradiated light, wherein the timing trigger controls an imaging operation of the imaging element;
providing back to the first external apparatus a status indicating in which state the imaging element is when the timing trigger is received; and
transmitting the data from the imaging element via a second link different from the first link to a second external apparatus different from the first external apparatus,
wherein receiving and processing the timing trigger from the first external apparatus occurs at the same time as transmitting the data to the second external apparatus.

10. The imaging apparatus according to claim 1, wherein the second external apparatus is a host computer.

11. The imaging apparatus according to claim 1, wherein the first link is not a universal serial bus.

12. The imaging apparatus control method according to claim 9, wherein
the first external apparatus exerts control also over an emission timing for a light source.

13. The imaging apparatus control method according to claim 9, further comprising
providing back the status to the first external apparatus also when the state of the imaging element is changed.

14. The imaging apparatus control method according to claim 9, wherein the timing trigger includes two types of triggers indicating the reset and the readout, the method further comprising:
writing the data from the imaging element to a memory when the received timing trigger indicates the readout.

15. The imaging apparatus control method according to claim 14, further comprising
starting transmission, via the second link, of the data written in the memory when starting writing of the data to the memory.

16. The imaging apparatus control method according to claim 15, wherein
the second link is a universal serial bus.

17. The imaging apparatus control method according to claim 9, wherein
for continuous imaging for a plurality of frames, the timing trigger indicates the readout for an n-th frame, and the reset for an n+1-th frame.

18. The imaging apparatus control method according to claim 9, further comprising:
issuing a synchronizing signal with respect to the imaging element; and
activating the imaging element in a low-current mode when receiving the timing trigger, and after issuing the synchronizing signal, putting the activated imaging element back to the low-current mode.

19. The imaging apparatus control method according to claim 9, wherein the second external apparatus is a host computer.

20. The imaging apparatus control method according to claim 9, wherein the first link is not a universal serial bus.

* * * * *